Feb. 13, 1962  E. R. FITCH  3,021,181
BRAKING SYSTEM SKID CONTROLLER
Filed Dec. 28, 1959
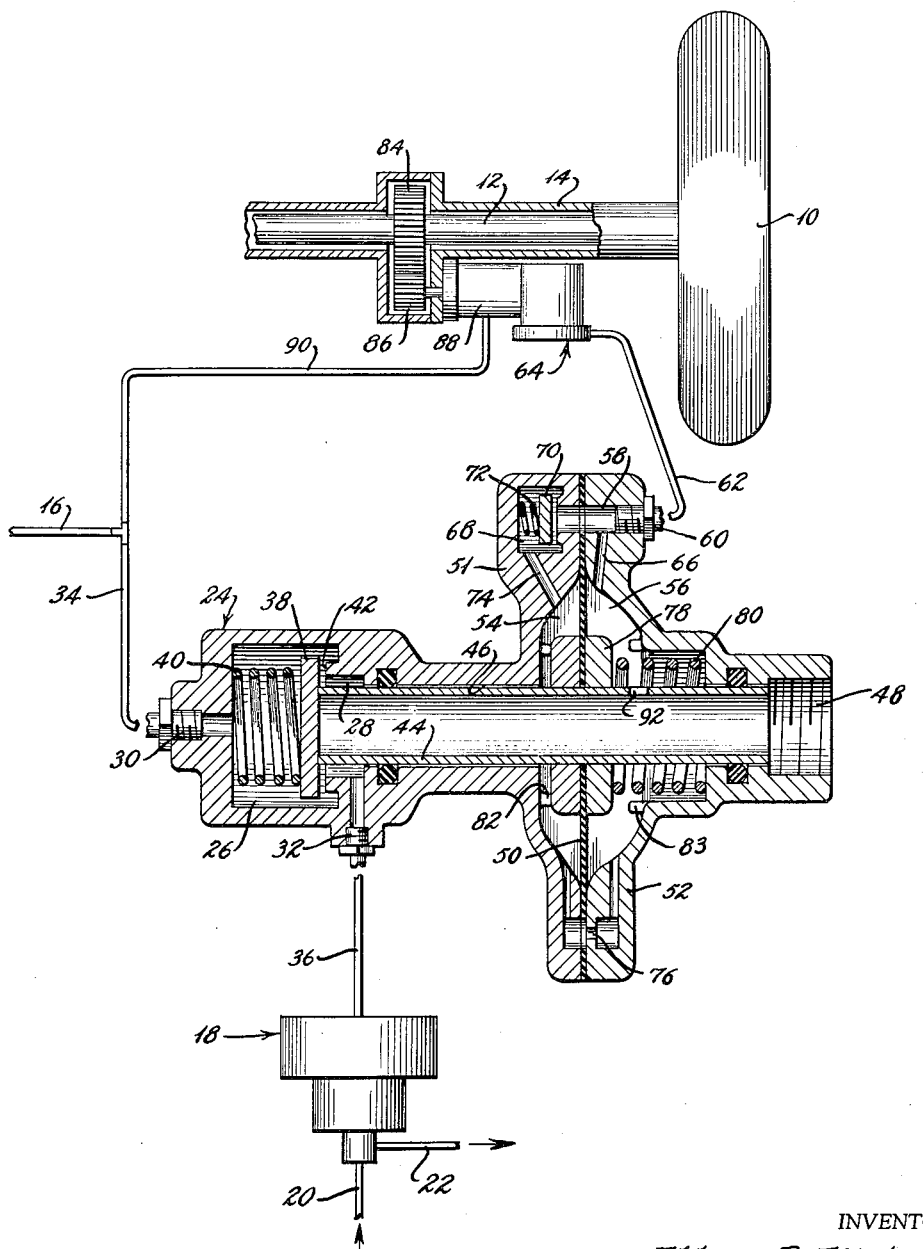
INVENTOR
*Ellery R. Fitch*
BY
*Scrivener & Parker*
ATTORNEYS

United States Patent Office 3,021,181
Patented Feb. 13, 1962

3,021,181
BRAKING SYSTEM SKID CONTROLLER
Ellery R. Fitch, Elyria, Ohio, assignor to Bendix-Westinghouse Automotive Air Brake Company, Elyria, Ohio, a corporation of Delaware
Filed Dec. 28, 1959, Ser. No. 862,299
6 Claims. (Cl. 303—21)

This invention relates to fluid pressure braking systems for vehicles and more particularly to an improved system for controlling or relieving applied braking pressure to prevent skidding of the vehicle.

A principal object of the invention is to provide a simple, inexpensive, light weight and reliable skid sensing system which is particularly, though not exclusively, suited for use on automotive vehicles employing fluid pressure braking systems.

Another object of the invention is to provide a wheel skid sensing system which is particularly suited for use in conventional fluid pressure brake systems employing a manually operated brake valve for controlling the application of fluid braking pressure to the brakes, the skid sensing system of the invention being incorporated in the service line to modify the brake control pressure independently of the brake valve in accordance with any tendency of a wheel to skid.

Other objects and their attendant advantages will become apparent as the following detailed description is read in conjunction with the accompanying drawings wherein the single figure is a partly schematic view of the system of the invention.

Referring now to the drawings, 10 designates a conventional automotive vehicle wheel which is connected to an axle 12 rotatable in an axle housing 14. The wheel 10 is representative of any of a plurality with which a vehicle may be equipped with the wheel being braked by service pressure delivered from a brake valve (not shown) through a service conduit 16 to a relay valve 18. This member is of well-known construction and includes a diaphragm to which service pressure is delivered to move the diaphragm against spring pressure to close off an exhaust passage and open an inlet valve between a supply conduit 20, connected to a nearby pressure reservoir (not shown) and a delivery conduit 22 leading to a brake chamber (not shown). When the pressure under the diaphragm, and thus also in the brake chamber, is equal to the service pressure on top of the diaphragm, the spring moves the relay valve mechanism to lap position wherein both the exhaust passage and the inlet valve are closed. Whenever service pressure on top of the diaphragm is relieved, the pressure under the diaphragm then exceeds the service pressure and the diaphragm is moved upwardly to open the exhaust passage through which brake chamber pressure escapes until it is equal to the service pressure whereupon the relay valve again laps and the reduced pressure is retained constant in the brake chamber until the service pressure is varied in one direction or the other by manipulation of the brake valve.

The foregoing is a brief description of a typical relay valve which is well-known and widely used in a large majority of fluid pressure braking systems and a detailed showing of the valve is not necessary. The present invention is concerned with relieving service pressure, and thus lowering braking pressure, entirely independently of the brake valve whenever the initial service pressure and hence braking pressure is excessive for vehicle loading and/or road conditions so that the wheel decelerates faster than the vehicle and tends to lock and skid. To this end therefore there is incorporated in the service line a skid sensing valve mechanism comprising a body 24 containing inlet and delivery cavities 26, 28 having ports 30, 32 respectively connected to conduits 34, 36 leading in turn to the service line 16 and to the control chamber of the relay valve 18 respectively.

Contained within the inlet cavity 26 of the valve body 24 is a check valve member 38 urged by a spring 40 in the direction of a valve seat 42 between the inlet and delivery cavities 26, 28. The valve member 38 is normally retained off the seat 42 by one end of a hollow exhaust plunger 44 slideable in a sealed bore 46 in the valve body. The opposite end of the hollow plunger 44 is connected at all times to atmosphere through an exhaust port 48 and as the plunger is slid in the bore by means later described it serves to connect the inlet and delivery cavities and close the exhaust passage in the plunger, when the parts of the valve are in the position of the drawing, or to disconnect the inlet and delivery cavities by allowing the valve 38 to engage seat 42 and connect the delivery cavity to the exhaust port 48 when the plunger is moved sufficiently far to the right in the drawing. Obviously, when the delivery cavity 28 is connected to the exhaust port 48, pressure in the control chamber of the relay valve 18 is released to atmosphere by way of conduit 36, delivery chamber 28, and the hollow plunger 46, thereby effecting a decrease in braking force on the wheel 10.

In accordance with the invention, the plunger 44 is moved in opposite direction in accordance with skidding tendencies of the wheel 10. This is accomplished by securing the plunger 44 to a diaphragm 50 whose peripheral edge is clamped between an enlarged part 51 of the body member 24 and an upper part 52 containing the exhaust port 48. The parts 51, 52 are recessed to provide opposed pressure chambers 54, 56 which are separated from each other by the diaphragm 50 but are interconnected by way of a fluid passage 58 having a port 60 connected to a conduit 62 leading to fluid pressure generating means 64 operated by rotation of the wheel 10. The fluid passage 58 has a branch 66 leading to the chamber 56 on the right hand side of the diaphragm, with the passage 58 extending into a check valve cavity 68 containing a check valve 70 normally urged by a spring 72 to a position closing the passage 58. The cavity 68 is connected to the chamber 54 on the left hand side of the diaphragm by way of a passage 74. In addition to passage 58, the pressure chambers 54, 56 are interconnected by way of a choke passage 76 which restricts the flow of fluid pressure from the left hand chamber 54 to the right hand chamber 56 for reasons which will become apparent.

The plunger 44 is connected to the diaphragm in any suitable manner as by the clamping elements 78 shown and the plunger and diaphragm are normally urged to the position of the drawing by a spring 80 of greater force than the spring 40, with a suitable stop 82 limiting the movement of the assembly in a valve opening direction, similar stops 83 being provided on the opposite side to limit movement in that direction.

The pressure generating means 64, previously mentioned, may comprise any suitable device such as a compressor or centrifugal valve which may be driven through a gear 84 secured on the axle 12 and a pinion 86 which may be connected to the compressor or other pressure generating means through a conventional air clutch 88 which is energized by service pressure through a branch conduit 90 only at such times as the brake valve is operated to supply service pressure to the line 16 and hence to the relay valve 18. By energizing the compressor means only at such times as the brakes are applied, unnecessary operation and consequent wear of the pressure generating means is avoided.

The compressor or other air pressure delivering means 64 is intended to deliver pressure which is substantially in direct proportion to wheel speed. In order that the delivered pressure response will be almost instantaneous with wheel speed at any given moment, an atmospheric choke hole 92 extends through the plunger 44 and serves to connect the interior of the plunger to the chamber 56. With this arrangement, as wheel speed is reduced the delivered pressure of compressor 64 is reduced at an equivalent rate. For purposes that will become apparent, choke hole 92 is larger than choke 76.

In operation, as the vehicle is moving along the road and the brakes are applied, service pressure is delivered from the brake valve to the conduit 16 from whence it flows by way of conduit 90 to energize the clutch 88, and by way of conduit 34, inlet and delivery cavities 26, 28 in valve body 24 and conduit 36 to the control chamber of the relay valve 18. As the pressure builds up in the control chamber of the relay valve, its exhaust valve is closed and its inlet valve opened to admit pressure to the brake chambers as above described.

Concurrent with the delivery of pressure to the control chamber of the relay valve and the energization of the clutch, the wheel driven pressure generating means 64 commences to deliver pressure through conduit 62 to chamber 56 on the right hand side of the diaphragm 50 and through passages 58 and 74 to chamber 54 on the left hand side. The choke 76 is of such a size that the rate of flow therethrough is sufficient to balance the pressures on both sides of the diaphragm during normal deceleration of the wheel but for any marked sudden decrease in the pressure on the right hand side of the diaphragm, the choke is too small to pass sufficient pressure to retain the balance on both sides of the diaphragm with the result that the pressure on the left hand side moves the diaphragm and hence the plunger to the right against spring 80 causing valve 38 to close against seat 42 and the plunger end to pull away from the valve to disconnect the service line 34 from the relay valve while simultaneously connecting the latter to atmosphere, thereby decreasing the brake chamber pressure as above explained.

Pressure on the right hand side of the diaphragm is naturally decreased as the compressor 64 is slowed with the decelerating wheel. When this pressure falls at a predetermined normal rate the pressure on the left side of the diaphragm falls at substantially the same rate as determined by the choke hole 76. However, should the wheel start to slow at a much faster rate than normal, as would occur when excessive brake pressure is applied under slippery road conditions, the compressor 64 also slows at this increased rate so that the pressure on the right hand side of the diaphragm falls a correspondingly faster amount by escaping through the exhaust choke 92 while the pressure on the left side is endeavoring to crowd through the choke 76. Inasmuch as the choke 92 is larger than choke 76, pressure will escape to atmosphere through the former faster than it can be replenished through the latter with the result that the diaphragm moves to the right to dump air from the brake chambers, whereupon the wheel 10 accelerates until the compressor 64 delivers sufficient air to the chambers 54, 56 to cause the diaphragm again to move to the balanced position of the drawing.

The foregoing describes a system for controlling skidding tendencies of a wheel by the provision of an auxiliary supply of pressure which is at all times related to wheel speed to effect the supply and exhaust of service pressure to a brake chamber independently of the brake valve setting. The auxiliary supply of air pressure may be provided by any suitable type of compressor known in the art or it may be provided by a centrifugal valve. The compressor has been described as being controlled by a clutch responsive to service pressure. It will be apparent that if desired the compressor could operate continuously or be controlled through a clutch operated by a solenoid which is responsive to a manual or to a brake pedal operated switch. Though the invention has been described in connection with a relay, it will be apparent that the controller can be equally well connected directly to the brake chamber either behind a relay valve, where used, or in a system where no relay valve at all is used. Thus member 18 can be considered either as a relay valve or as a brake chamber without departing from the invention. The exhaust port 48 has been described as connected to atmosphere. This could be and perhaps preferably should be connected to the vehicle's tail pipe. For complete control of all the wheels, a separate relay valve could be provided for each so that when any one of them starts to skid, the braking torque will be released only on that wheel.

The foregoing modifications and changes, in addition to other modifications, are contemplated as being within the purview of the invention without, however, departing from the scope and spirit of the appended claims.

What is claimed is:

1. In combination with a brake system for a vehicle wheel comprising a service conduit and a relay valve connected to said conduit for controlling the flow of fluid pressure to and from a brake chamber associated with said wheel, a valve body having inlet and delivery ports respectively connected to said service conduit and said relay valve and having an exhaust port, a valve member in said body movable from a normal position connecting said service conduit and said relay valve to a second position disconnecting said service conduit and relay valve and connecting the latter to the exhaust port, a fluid pressure responsive element operatively connected to said valve, said element having opposed motive areas so as to be movable in opposite directions depending on the relative magnitude of the pressures acting on the respective areas, fluid pressure delivery means operatively connected to said wheel so as to be driven in synchronism therewith, conduit means connecting the opposed motive areas of said element to the outlet of said pressure delivery means, restricted orifice means connecting the outlet of said pressure delivery means to atmosphere, said orifice means being so arranged and constructed that the pressure delivered to said motive areas is proportional to the speed of operation of said delivery means and of said wheel, check valve means for preventing the backflow of delivered pressure from one of said motive areas to said restricted orifice means, and second restricted orifice means interconnecting said motive areas, said operative connection between said element and said valve member being arranged and constructed that upon a sudden decrease in pressure delivered by said delivery means because of greater than normal deceleration of said wheel and consequent movement of said element in the direction of the area receiving the decreased pressure, said valve member is moved to a position connecting said relay valve to said exhaust port, and resilient means connected to said element for moving it to its first normal position when pressure is equalized through said second orifice means on both areas of said element.

2. A wheel skid sensitive brake controller for a vehicle fluid pressure brake system including a device for controlling the braking force on said vehicle wheel and a service brake pressure conduit connected to said device, said controller comprising valve means in said service conduit movable from a normal position connecting pressure in said conduit to said device to a position disconnecting service pressure from said device and connecting the latter to atmosphere, double acting fluid pressure responsive means operatively connected to said valve means and resiliently urged to a position retaining said valve means in its normal position, compressed air delivering means for delivering pressurized air simultaneously to both sides of said pressure responsive means, means for varying the pressure of said delivered air in substantially direct proportion to wheel speed, and means for retarding the decrease of pressure on one side of said pressure responsive means so that it decreases on that side at a slower rate than on the other as a result of greater than normal deceleration of said wheel and consequent greater than normal decrease in the pressure of the delivered air, said pressure responsive means being moved by the greater resultant pressure acting on the last mentioned side in a direction causing said valve means to move from its first normal position to its second position thereby connecting said device to atmosphere to decrease braking force until the wheel accelerates and substantially equal air pressure is again delivered to both sides of said pressure responsive means, and said element again returns to its normal position, and the means for retarding the decrease in fluid pressure on one side of the element comprising a normally closed check valve openable in the direction of flow of the delivered pressure to said one side, and restricted orifice means connecting the pressure on said one side with atmosphere.

3. The skid sensitive brake controller of claim 2 wherein the pressure responsive means comprises a double-acting diaphragm.

4. The skid sensitive brake controller of claim 3 wherein the valve means comprises a normally open check valve resiliently urged to a position disconnecting said service conduit and relay valve, and a hollow exhaust plunger connected to said diaphragm and resiliently urged against said check valve to retain said valve in its normal position and close said exhaust plunger.

5. The skid sensitive brake controller of claim 2 wherein the compressed air delivering means comprises a compressor driven by said wheel and the means for varying the delivered pressure in substantial direct proportion to wheel speed comprises a restricted orifice in the outlet of said compressor arranged to bleed continuously a portion of delivered pressure to atmosphere.

6. The skid sensitive controller of claim 5 including a clutch means between said wheel and said compressor and means for energizing said clutch only when service pressure is delivered to said service conduit.

References Cited in the file of this patent

UNITED STATES PATENTS

| | | |
|---|---|---|
| 2,672,335 | Keller | Mar. 16, 1954 |
| 2,869,687 | Keim et al. | Jan. 20, 1959 |

FOREIGN PATENTS

| | | |
|---|---|---|
| 711,987 | Germany | Oct. 9, 1941 |